US006829709B1

(12) United States Patent
Acharya et al.

(10) Patent No.: US 6,829,709 B1
(45) Date of Patent: Dec. 7, 2004

(54) VALIDATION OF NETWORK COMMUNICATION TUNNELS

(75) Inventors: Arup Acharya, Westwood, NJ (US); Mandis Beigi, Tarrytown, NY (US); Raymond Byars Jennings, III, Ossining, NY (US); Reiner Sailer, Yorktown Heights, NY (US); Dinesh Chandra Verma, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 09/580,769

(22) Filed: May 30, 2000

(51) Int. Cl.[7] .......... G06F 1/24

(52) U.S. Cl. .......... 713/160; 370/401; 370/389; 370/338; 709/245; 709/237; 714/712

(58) Field of Search .......... 370/401, 389, 370/338; 709/245, 237; 714/712; 713/160

(56) References Cited

U.S. PATENT DOCUMENTS

| | | | | |
|---|---|---|---|---|
| 5,708,654 A | * | 1/1998 | Arndt et al. | 370/242 |
| 5,864,666 A | * | 1/1999 | Shrader | 713/201 |
| 5,931,961 A | * | 8/1999 | Ranganathan et al. | 714/712 |
| 6,028,933 A | * | 2/2000 | Heer et al. | 713/169 |
| 6,104,716 A | * | 8/2000 | Crichton et al. | 370/401 |
| 6,195,705 B1 | * | 2/2001 | Leung | 709/245 |
| 6,212,634 B1 | * | 4/2001 | Geer et al. | 713/156 |
| 6,301,229 B1 | * | 10/2001 | Araujo et al. | 370/252 |
| 6,337,861 B1 | * | 1/2002 | Rosen | 370/389 |
| 6,438,612 B1 | * | 8/2002 | Ylonen | 709/249 |
| 6,466,964 B1 | * | 10/2002 | Leung et al. | 709/202 |
| 6,473,798 B1 | * | 10/2002 | Grosser et al. | 709/224 |
| 6,496,704 B2 | * | 12/2002 | Yuan | 455/466 |
| 6,501,746 B1 | * | 12/2002 | Leung | 370/338 |
| 6,501,760 B1 | * | 12/2002 | Ohba | 370/395.42 |
| 6,574,214 B1 | * | 6/2003 | Khalil et al. | 370/349 |
| 6,591,306 B1 | * | 7/2003 | Redlich | 709/245 |
| 6,621,810 B1 | * | 9/2003 | Leung | 370/338 |
| 6,625,657 B1 | * | 9/2003 | Bullard | 709/237 |
| 6,628,654 B1 | * | 9/2003 | Albert et al. | 370/389 |

OTHER PUBLICATIONS

S. Hanks et al., "Generic Routing Encapsulation (GRE)," Network Working Group Request For Comments: 1701, Oct. 1994, p. 1–7, http://www.ietf.org/rfc/rfc1701.txt.

S. Hanks et al., "Generic Routing Encapsulation Over IPv4 Networks," Network Working Group Request For Comments: 1702, Oct. 1994, p. 1–4, http://www.ietf.org/rfc/rfc1702.txt.

S. Kent et al., "Security Architecture For The Internet Protocol," Network Working Group Request For Comments: 2401, Nov. 1998, p. 1–57, http://www.ietf.org/rfc/rfc2401.txt.

(List continued on next page.)

*Primary Examiner*—Gregory Morse
*Assistant Examiner*—Tongoc Tran
(74) *Attorney, Agent, or Firm*—Louis P. Herzberg

(57) ABSTRACT

This invention provides methods and apparatus for validating that transformations that are expected to occur in an IP network are indeed occurring as expected. Generally, these transformations establish logical communication tunnels within an IP network between the devices that perform the transformation and the devices that perform the reverse transformation. The invention is useful to validate the configuration of devices that support a variety of IP transformation methods, including IP-security protocols using the standard Encrypted Secure Payload protocol and Authenticated Header protocols as defined by the IETF. The invention is particularly useful to validate cases in which transformations occur on the full path of a packet traversing between two machines in an IP network, or when the transformations only occur on part of this path.

19 Claims, 15 Drawing Sheets

OTHER PUBLICATIONS

S. Kent et al., "IP Authentication Header," Network Working Group Request For Comments: 2402, Nov. 1998, p. 1–19, http://www.ietf.org/rfc/rfc2402.txt.

S. Kent et al., "IP Encapsulating Security Payload (ESP)," Network Working Group Request For Comments: 2406, Nov. 1998, p. 1–19, http://www.ietf.org/rfc/rfc2406.txt.

K. Egevang et al., "The IP Network Address Translator (NAT)," Network Working Group Request For Comments: 1631, May 1994, p. 1–9, http://www.ietf.org/rfc/rfc1631.txt.

G. Tsirtsis et al., "Network Address Translation –Protocol Translation (NAT–PT)," Network Working Group Request For Comments: 2766, Feb. 2000, p. 1–19, http://www.ietf.org/rfc/rfc2766.txt.

* cited by examiner

VALIDATION OF NETWORK COMMUNICATION TUNNELS

FIELD OF THE INVENTION

This invention is directed to the field of computer networks. It is more particularly directed to network devices that transform packets traveling in an IP network in various manners.

BACKGROUND OF THE INVENTION

The Internet Protocol (herein referred to as IP) is a preferred communication mechanism used in the Internet and many enterprise networks. The original IP communication was designed so that the network would deliver the IP packets created by a source machine to a destination machine without any significant modifications to the contents of the IP packet. Some minor modifications were made to the contents of the header of an IP Packets during the course of normal processing, but most of the fields of the IP header and the payload were left unmodified.

In order to meet the varying security and scalability needs that arise within the Internet and enterprise IP intranets, it has become common practice to perform different types of transformations on an IP packet. Example of such transformations include the encryption of IP packets, compressing IP payload, encapsulating an IP packet within another IP packet, translating the source/destination address to some other value within the network, etc. Such transformations are most often performed in a transparent fashion, such that an application that is sending the IP packets in the network is often not aware of the fact that such transformations are being done within the network. A transformation may be done by the kernel of an originating machine, or by an intermediary router or firewall in the network. Such transparent transformations are hidden from the receiving application by a reverse transformation which is performed in the kernel of the receiving machine or at another intermediary device close to the receiving machine. These transformations establish logical communication tunnels within an IP network between the devices that perform the transformation and the devices that perform the reverse transformation. The IP communication tunnel could be established on the entire path of an IP packet, when the transformation is done at the source machine and the reverse transformation at the destination machine. An IP communication tunnel could also apply only to part of a route between a pair of communicating machines, with a network device doing the transformation at a point in the path of the packet, and another network device performing the reverse transformation in the path of the packet.

An example of a transformation process, is the IP-security protocol using the Encrypted Secure Payload mechanism in a tunnel mode. It enables a router (or source machine) to encrypt an IP packet and put it within a new IP packet header on the source side. This transformation is reversed close to the destination machine by a router and the original IP packet is regenerated. The reverse transformation can also be done by the destination machine kernel itself. Other types of transformations include IP security protocol using the Encrypted Secure Payload in a transport mode, IP security protocol using the Authentication header in a transport mode, IP security protocol using the Authentication Header in a tunnel mode, Generic Routing Encapsulation, Network Address translation etc. These transformations are described in various Internet Request For Comments (RFCs), namely RFC 2401, RFC 2406, RFC 2402, RFC 1701, RFC 1702, RFC 1631, RFC 2766 etc., These transformations are known to those skilled in the art.

These Internet Network Working Group submissions are herein incorporated by reference in entirety.

One of the key aspects of these transformations is that they are to be applied transparently to IP packets such that the originating applications are not aware of the existence of the transformation process. The transformation process is usually put into place by configuration and administration of the network devices (servers, firewalls or routers) that perform the transformation. However, in many cases, one needs to validate that the transformation has actually been accomplished, and that the communicating applications are communicating with each other using the transformation.

A usual mechanism to ensure that things are set up properly for two machines to communicate on an IP network is to use a program like ping. It sends an IP packet defined according to the Internet ICMP standards from one machine to another, and the latter provides a response to the original ICMP packet. Upon receiving the ICMP packet, the original machine is assured that communication is possible between the two machines. However, when transformation are in place, it is advantageous to have a way to ensure not only that the communication is possible, but that the communication is happening with the right transformations taking place. Communication may be taking place without any transformations, or may be happening with incorrect transformations. In most environments, the transformation should be occurring correctly. It is unacceptable that packets be sent in the clear when they require an IP-sec encryption transformation. Existing schemes for ensuring that there is connectivity between machines can not be used for the purpose of validating communication when transformations are taking place.

It would also be advantageous that the validation of the communication be able to be accomplished by an individual operating from one node, or by a management console which is responsible for managing the configuration of multiple machines in an IP network.

SUMMARY OF THE INVENTION

It is therefore an aspect of the present invention to provide methods and apparatus by which a network user or administrator at a central console can validate that transformations required for communication to another machine have been set up properly.

In another aspect of the invention, a network user or administrator uses a method disclosed herein to validate that IP-sec tunnels performing Encrypted Secure Payload transformations in tunnel or transport mode have been established properly between communicating firewalls, routers and/or hosts.

In still another aspect of the invention, a network user or administrator uses a method disclosed herein to validate that IP-sec tunnels performing Authentication Header transformations in tunnel or transport mode have been established properly between communicating firewalls, routers and/or hosts.

In an alternative embodiment, a network user or administrator uses a method disclosed herein to validate that Generic Routing Encapsulation performing IP in IP encapsulation have been established properly between communicating firewalls, routers and/or hosts.

In a further aspect of the invention, a network user or administrator uses a method disclosed herein to validate that network address translation has been established properly between communicating network devices.

Other objects and a better understanding of the invention may be realized by referring to the detailed description.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

Figure 1:
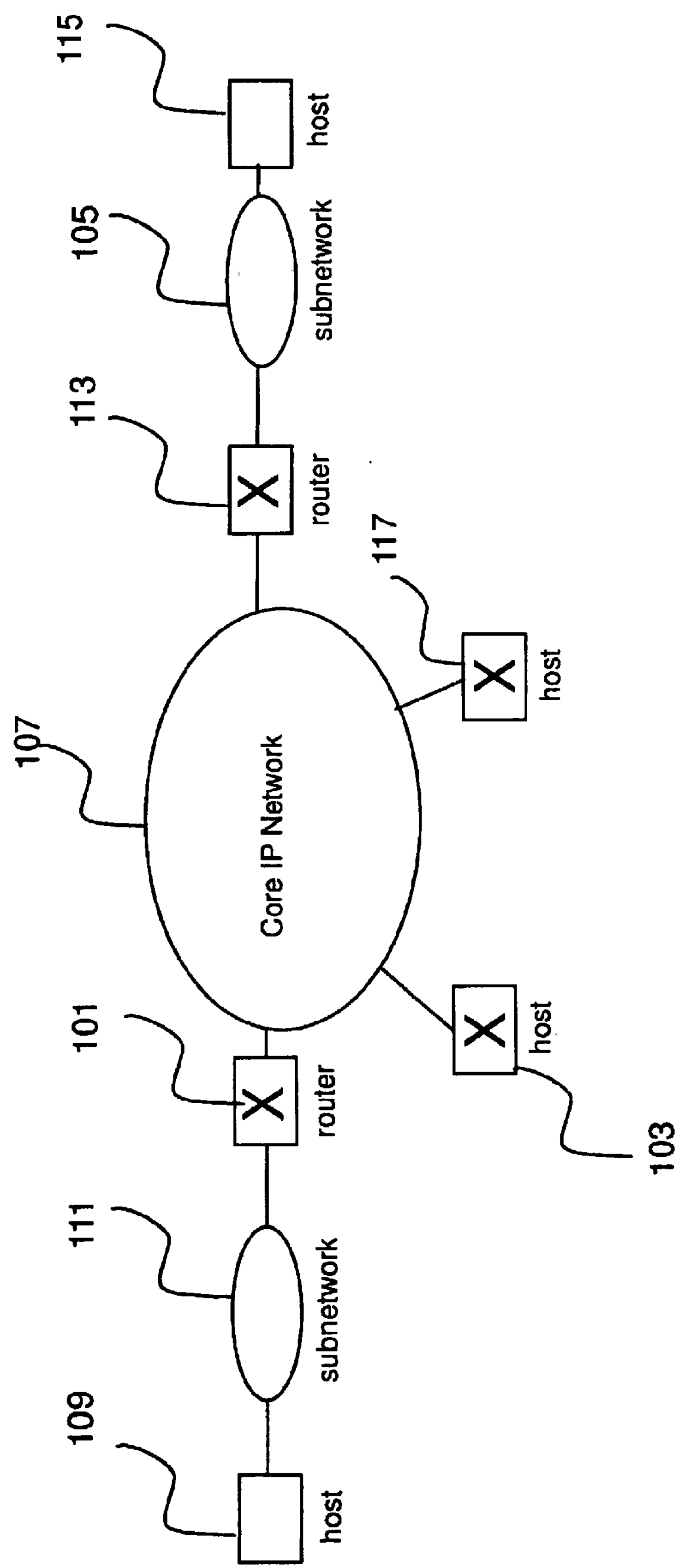
FIG. 1 shows an example of an environment having multiple network devices deployed in an IP network which use transformations among various points within the network.

The present invention provides methods and apparatus for validating transformations that occur in an IP network. It is generally directed to servers, routers, firewalls and other network devices that deploy techniques to transform packets traveling in an IP network in various manners, e.g. encrypting them for secure transmission, compressing the packets for reducing bandwidth usage, or translating network addresses. A typical environment in which transformations occur is illustrated in FIG. 1. It shows an example of an environment with multiple network devices deployed in an IP network which use transformations among various points within the network.

FIG. 1 shows a scenario wherein the IP subnetworks (105, 111) and hosts 103, 109, 115, 117 are connected to a core IP network 107. An example of such a core IP network is the Internet, a collection of networks using the IP protocol. Hosts can be connected directly to the core IP network 107, as exemplified by hosts 103 and 117, or they could be connected via intermediary routers and subnetworks. In the figure, hosts 109 and 115 connect to the core network through intermediary routers and subnets. Host 109 is connected to the subnetwork 111, which connects to the core network 107 through the router 101. Host 115 is connected to the subnetwork 105 which connects to the core network via the router 113. IP packets exchanged between subnetworks or hosts connected directly to the Internet are transformed at transformation points just before they enter and as soon as they leave the core IP network 107.

In FIG. 1, transformations can be done at hosts 103 and 117, as well as at routers 101 and 113. Examples of such transformations include compression functions to exploit the shared bandwidth of the Internet more effectively, tunneling (e. g. GRE/Network Address Translation) to hide network internal addresses against the Internet, or encryption or authentication functions (e. g. IP-sec) to protect data against unauthorized disclosure or unnoticed unauthorized change (forging). The transformation deployed at the receiving side usually inverts the transformation applied at the sender side.

If the transformations for a traffic flow between hosts 109 and 115 are done at network routers 101 and 114, they are transparent to the hosts. In this case, the hosts benefit from these transformations without having to care about their implementation and maintenance. The transformation for a traffic flow between hosts 103 and 117 occurs at the hosts themselves, but are done in a manner so as to be transparent to the applications running on these hosts. Thus, in this embodiment, various IP communication tunnels are identified. Each IP communication tunnel is defined by a pair of network devices which do a transformation and inverse transformation of packets traveling on the network. An example of such a communication tunnel is established between the network routers 101 and 114, while another example would be established between the hosts 103 and 117.

Figure 2:
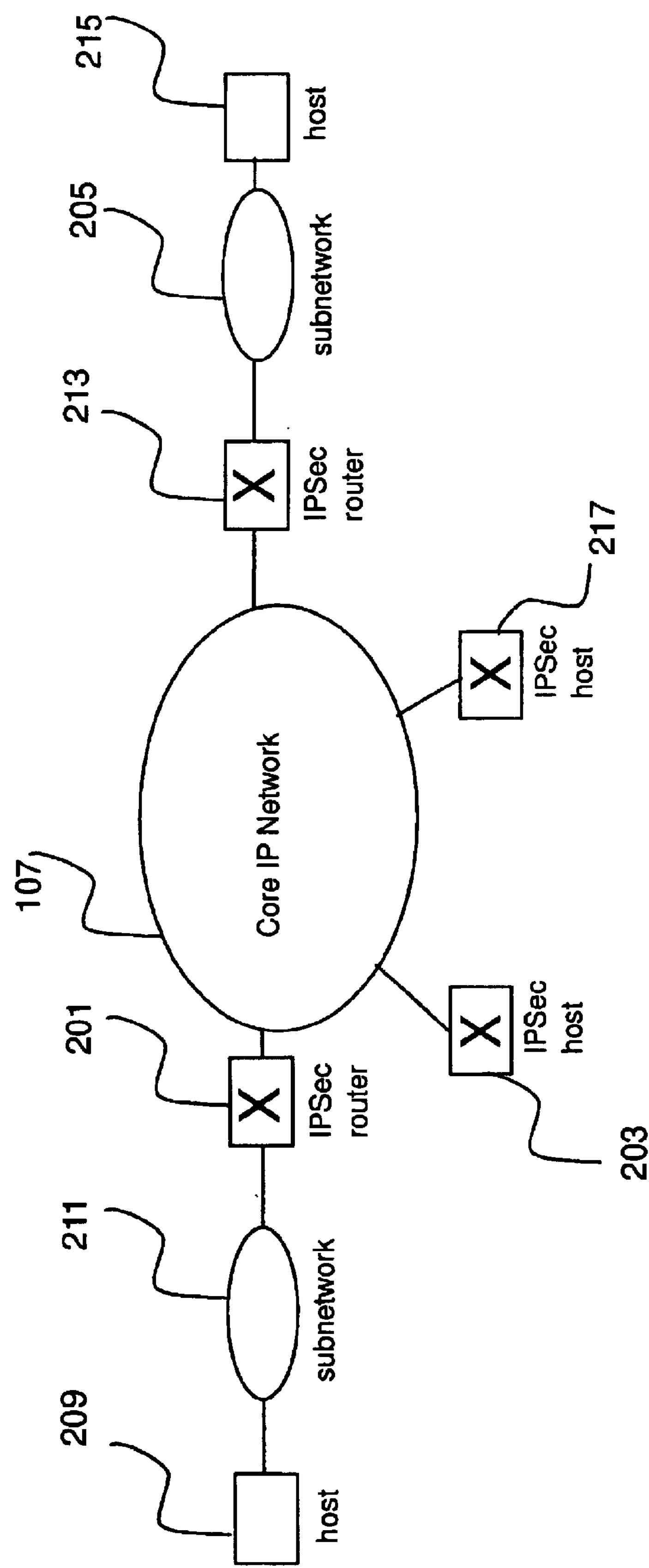
FIG. 2 shows an instance of the environment shown in FIG. 1, in which the specific transformation used is IP-sec based encryption using the Encrypted Secure Payload or the Authenticated Header mechanisms.

FIG. 2 shows an instance of the environment shown in FIG. 1, wherein the specific transformation used is IP-sec based encryption using the Encapsulating Security Payload or the Authenticated Header mechanisms. In this instance, IP-sec (as described in Internet RFC-2401) represents both a set of transformations to protect IP packets sent over distrusted subnetworks and mechanisms to negotiate the mode (tunnel or transport mode, ESP or AH protocol) and the actually employed transformations (e. g. triple des, des, hmac-md5, hmac-sha1). The negotiation is usually implemented by user processes based on the Internet Key Exchange protocol (IKE as defined in Internet RFC 2409). The IKE communication is based on the ISAKMP message exchange protocols defined in RFC 2408.

The scenario shown in FIG. 2 parallels that of FIG. 1, with a set of trusted IP subnetworks (205, 211) and trusted hosts 203, 209, 215, 217 connected to a an untrusted IP network 207. An example of such a untrusted IP network is the Internet. Examples of trusted subnetwork and servers are the networks and machines operated by an enterprise connected to the Internet. The trust relationship is from the point of the view of the enterprise deploying the subnetworks 205, 211 and the hosts 203, 209, 215, etc. Some trusted hosts can be connected directly to the untrusted IP network 207, as exemplified by hosts 203 and 217, or they could be connected via intermediary routers, firewalls and subnetworks. In the figure, hosts 209 and 215 connect to the core network through intermediary routers and subnets. Host 209 is connected to the subnetwork 211, which connects to the core network 207 through the router 201. Host 215 is connected to the subnetwork 205 which connects to the core network via the router 213. IP packets exchanged between subnetworks or hosts connected directly to the Internet are encrypted or authenticated just before they enter and as soon as they leave the untrusted IP network 207.

In the embodiment of FIG. 2, such encryption or authentication using the IP-security ESP or AH protocols is done at hosts 203 and 217, as well as at routers 201 and 213. The decryption of encrypted packets arriving from the untrusted network 207 is done for a traffic flow between hosts 209 and 215 are done at network routers 201 and 214, and is transparent for the hosts. The encryption/authentication for a traffic flow between hosts 203 and 217 occurs at the hosts themselves, but are done in a manner so as to be transparent to the applications running on these hosts.

Before packets can be exchanged between the subnetworks (cf. 201) over the Internet (cf. 203), related IKE processes as part of the IP-sec routers (cf. 205) will negotiate the transformations to be deployed. Afterwards, IP packets that leave the IP-sec routers to enter the Internet will be encapsulated using the Encapsulating Security Payload or the Authentication Header protocol according to the negotiated transforms and modes. When the protected packets arrive at the peer IP-sec router, the inverse transforms are applied and the resulting clear text IP packets are sent into the peer subnetwork. If the IP-sec functions are applied within a host 207, the packets are encapsulated and decapsulated within the hosts before they are sent via the network interface into the IP network. Generally, packets are protected on the path between peer IP-sec transformation functions. As the transforms are applied pairwise, they can be verified only in between the transformation. In the present embodiment, packets are inspected as they appear in between peer transformation points.

Figure 3:
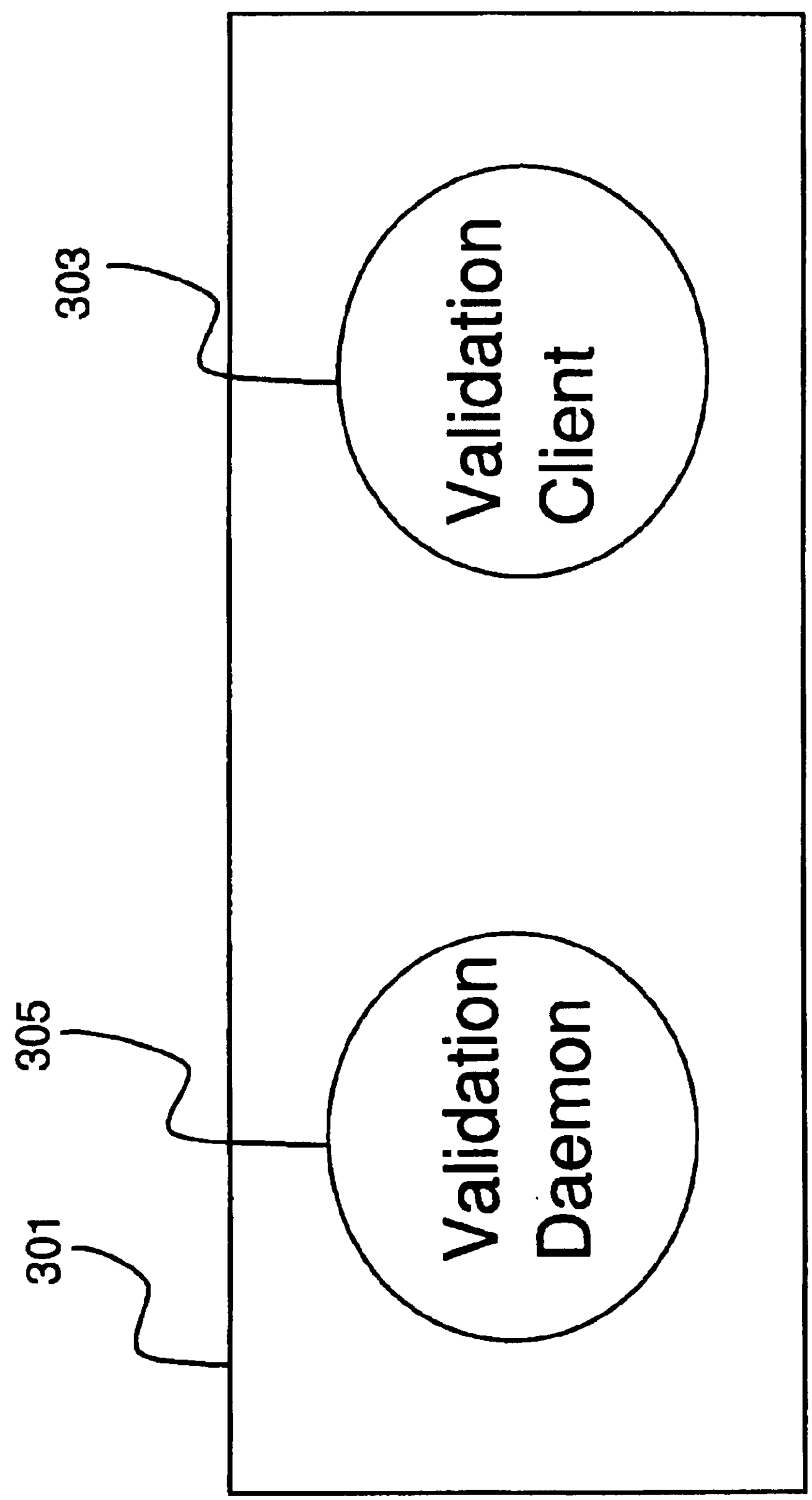
FIG. 3 shows an example deployment of validation mechanisms described in this invention in the environment described by FIG. 1 and FIG. 2.

In order to validate the transformations that are occurring in the network, we augment the traditional packet processing in machines with additional functions. FIG. 3 shows the structure for a machine that is running on the network that can deploy the present invention. The machine 301 could be a end-host (e. g. 103 in FIG. 1) that does the transformation, a router (e. g. 113 in FIG. 1) that does the transformation. It can also be a machine that does not do the transformation (e. g. 109 in FIG. 1), but relies on some other device to do the transformation in the network. Any device 301 implementing this validation method includes two software components, a validation daemon 305 and a validation client 303. In some embodiments of this invention, the validation daemon 305 need not be present as a separate module. In these embodiment the functionality of the validation daemon is already provided by traditional IP services. The validation client 303 initiates the validation scheme, and the validation daemon 305 which responds to messages generated by a validation client running on a different machines. Both the validation client 303 and the validation daemon 305 depend on the packet transmission capability available in the box 301 to communicate with the other devices in the network.

In an embodiment, when it is desired to validate the transformations that are happening on a packet flow between a pair of machines, the validation client is invoked on one of the machines. This machine is the originator of the validation process. This validation process validates that the transformations are occurring properly on the IP communication tunnel established between the two machines. When the validation client 301 on the originator initiates a sequence of message to verify that transformations are occurring on a set of packets being exchanged between itself and another participant in the tunnel, the first step is to verify that the expected transformation is applied on packets leaving the local machine to the server. If this test is successful, the validation client 303 on the originator machine sends a requests to the validation daemon 305 on the participant machine to make a similar validation on its end. An exchange of messages is made to ensure that the communication is feasible between the machines on the tunnel. If the expected transformations are applied in both directions, the validation process is said to be completed successfully.

The present invention considers various transformations like IP-sec in tunnel and transport mode, GRE, general compression, Masquerading, PPP tunneling, etc. It includes not only the procedures for the local tests but also the protocol for the communication between client and server including message types, message fields, and the tasks to be applied on sending and receiving respective messages (communication protocol).

Figure 4:
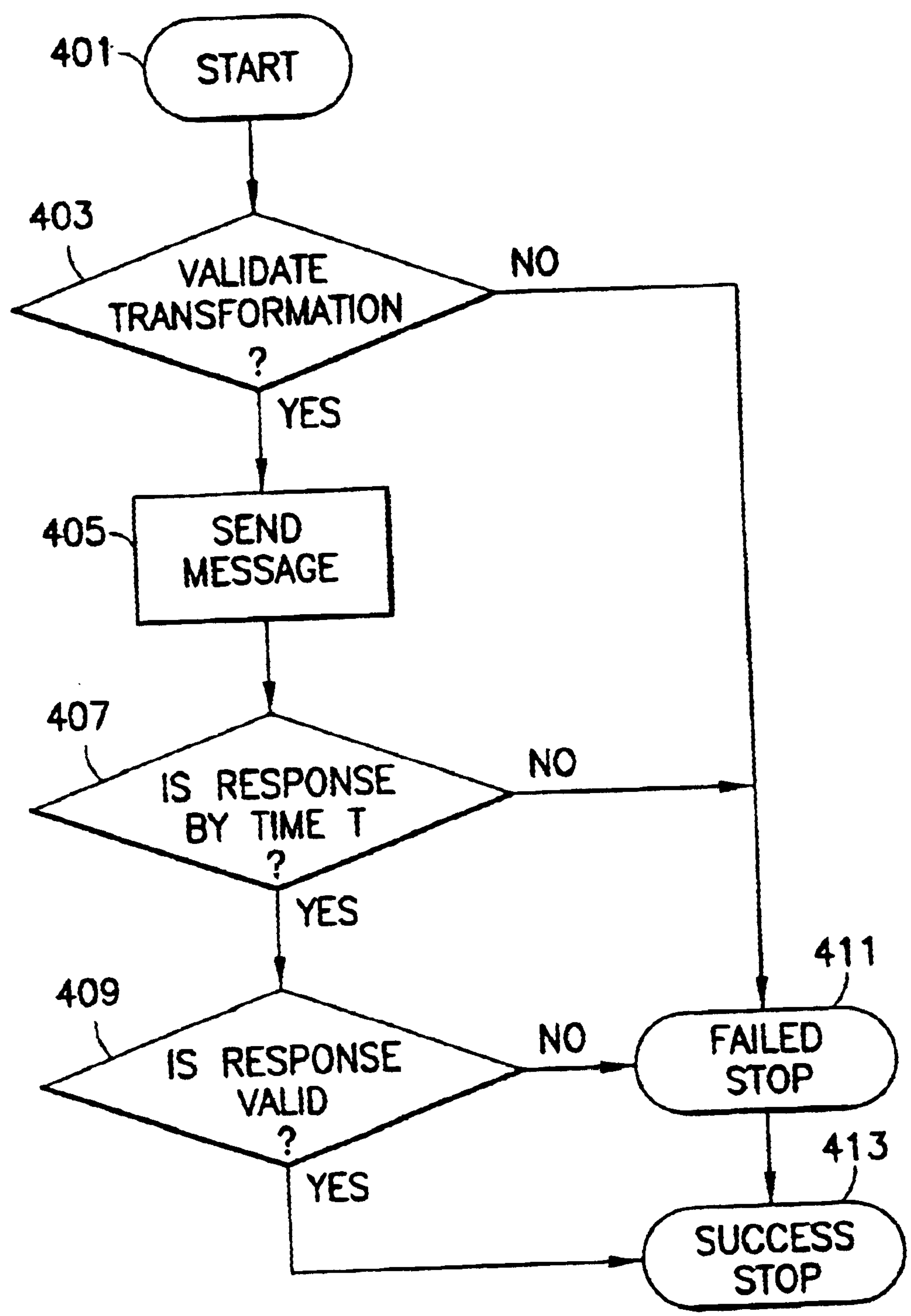
FIG. 4 shows an example of a flowchart of a method used for validation mechanism described in this invention by a program running on a machine that initiates the validation scheme, i. e. the client machine for the validation scheme.

FIG. 4 shows an example flowchart that illustrates a method that used for a validation mechanism by the validation client 303. The flowchart is entered in step 401 whenever the validation client on a validation process originator machine is invoked. Such an invocation can be done by an operator, or by a script in the absence of an operator. In step 403, the method validates that the transformations are occurring as expected on packets that are originating from it. Detailed descriptions of various techniques that can be used to perform this step are described subsequently in regard to FIGS. 9, 10 and 11.

If the validate transformation step 403 fails, the validation process stops with failure in step 411. If the validate transformation step 403 succeeds, indicating that the transformation is happening as indicated, the send message procedure in step 405 is executed. This involves sending a message to the other participant in the tunnel. After the send message step, the originator waits in step 407 for a predetermined amount of time T to receive a response from the other participant. If no such message is received in step 407, the validation process stops with failure in step 411. If a message is received in step 407, the originator in step 409 validates that the response received is valid and as expected according to the transformation. If the response from the other participant is found to be valid, the validation step 409 succeeds, and the method declares the validation process to be successful and terminates in step 413. If at any of the steps in the method, the process does not succeed, the method declares the configuration to be invalid and terminates in step 411.

Figure 5:
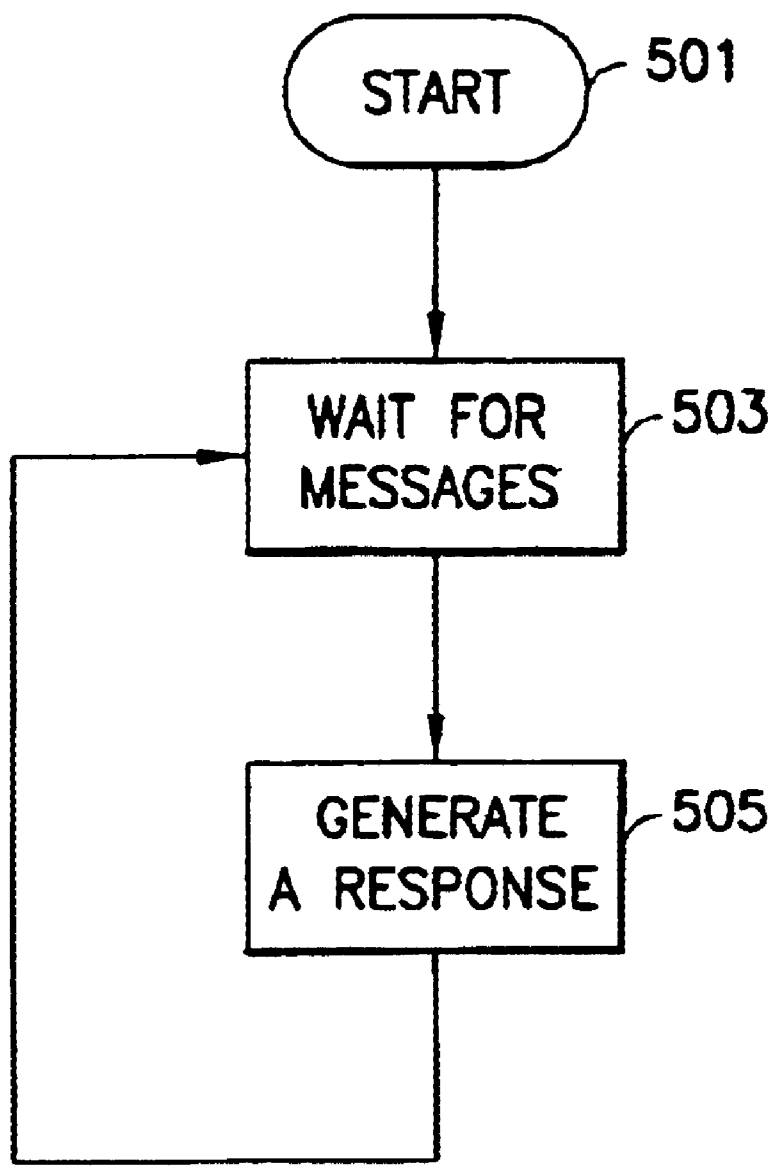
FIG. 5 shows an example of a flowchart of a method used for validation mechanism described in this invention by the server daemon program running on a machine that participates in the validation scheme.

FIG. 5 shows an example flowchart that illustrates a method used for a validation mechanism described in this invention by the validation daemon 305 running on a machine that participates in the validation scheme. The flowchart is entered in step 501 upon the initialization of the validation daemon 305. Such an initialization may be done when a machine is powered on or booted up, or it can be done by means of an explicit command when the machine is powered on. The validation daemon waits for messages from the client which is participating in the validation scheme (step 503). Once it receives a message, it executes a series of validation steps, generates a response and sends it back to the client (step 505). The validation daemon continues in the loop shown in FIG. 5 until it is stopped.

Figure 6:
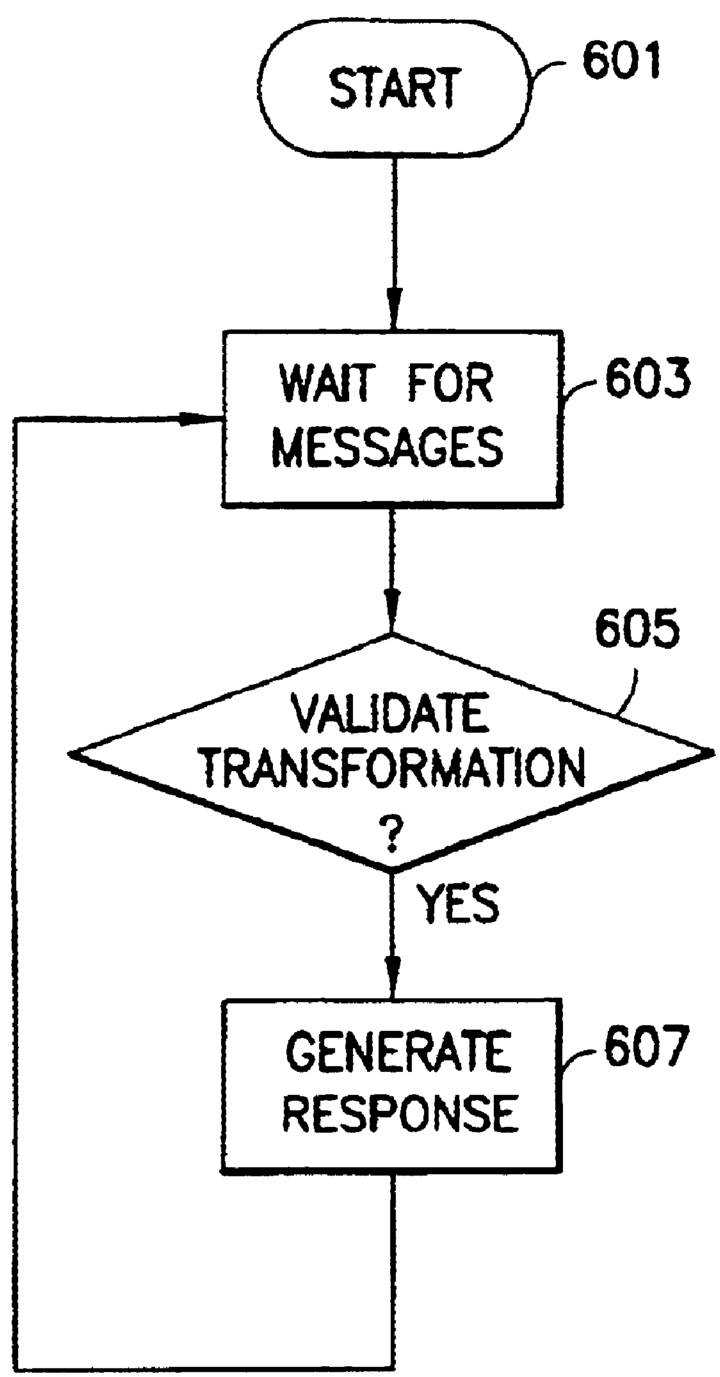
FIG. 6 shows an example of a flowchart of an alternative method used for a validation mechanism described in this invention by the server daemon program running on a machine that participates in the validation scheme.

FIG. 6 shows an example flowchart that illustrates an alternative method used for a validation mechanism by the server daemon program running on a machine that participates in the validation scheme. The server waits for messages from the client which is participating in the validation scheme (step 603). It then validates its own transformation (step 605). This can be done by performing one of the validation methods shown subsequently in FIGS. 9, 10 and 11. If the transformation is correct, it generates a positive response and sends it back to the client (step 607).

Figure 7:
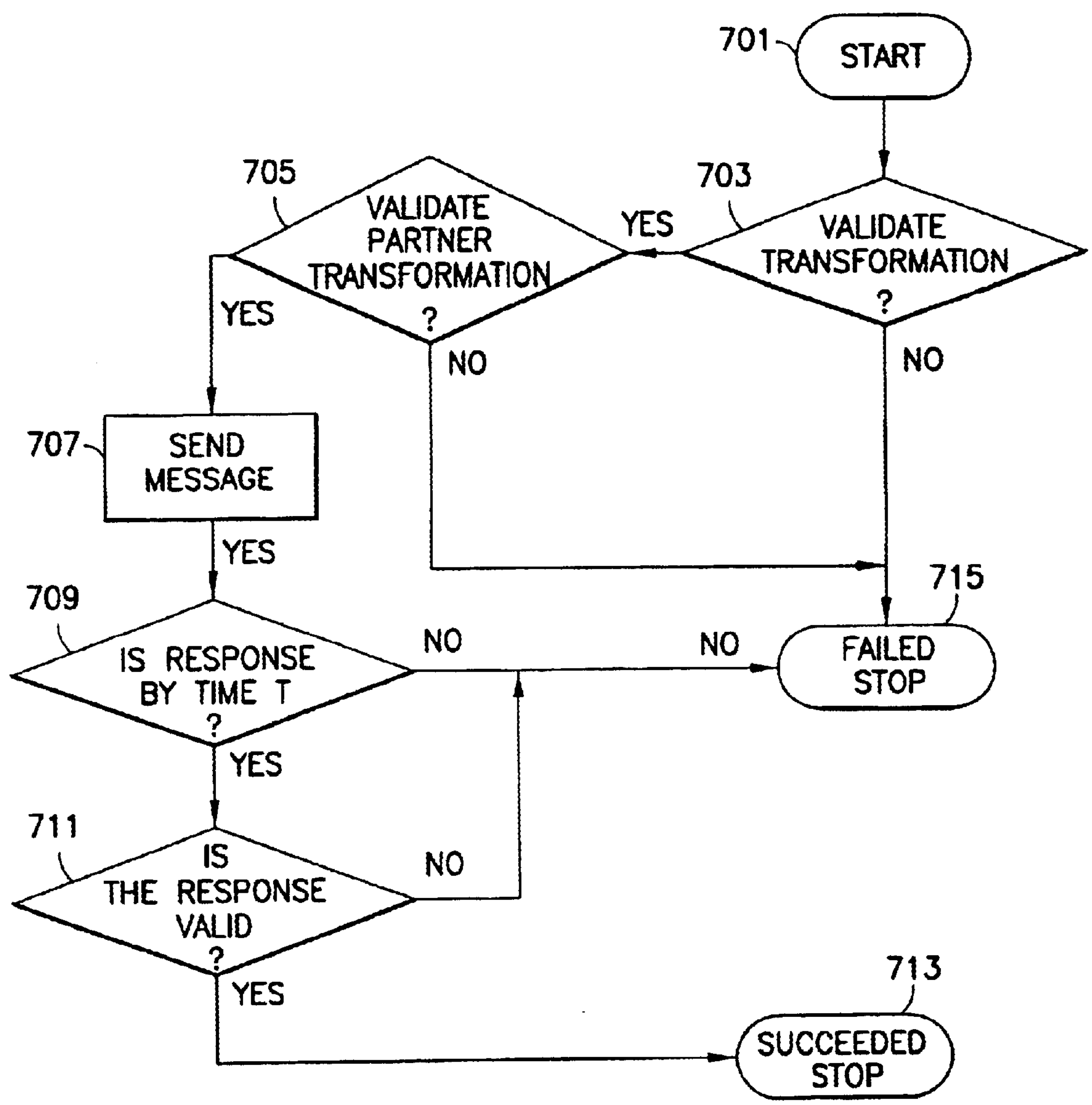
FIG. 7 shows an example of a flowchart of an alternative embodiment used for a validation mechanism described in this invention by a client machine.
Figure 9:
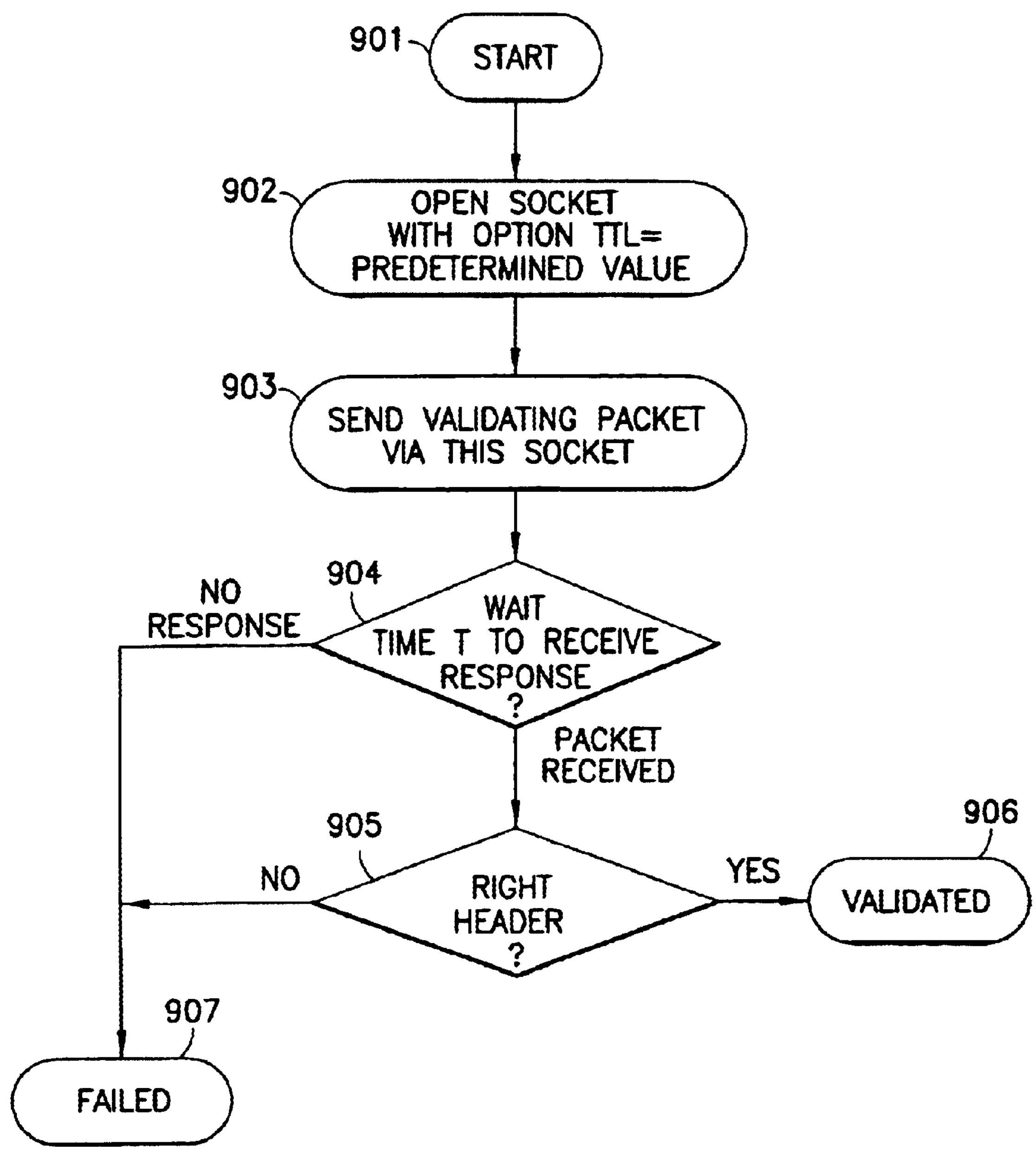
FIG. 9 shows an example of a flowchart of a method for performing a validation step utilizing packets created with a known time-to-live within the network.
Figure 10:
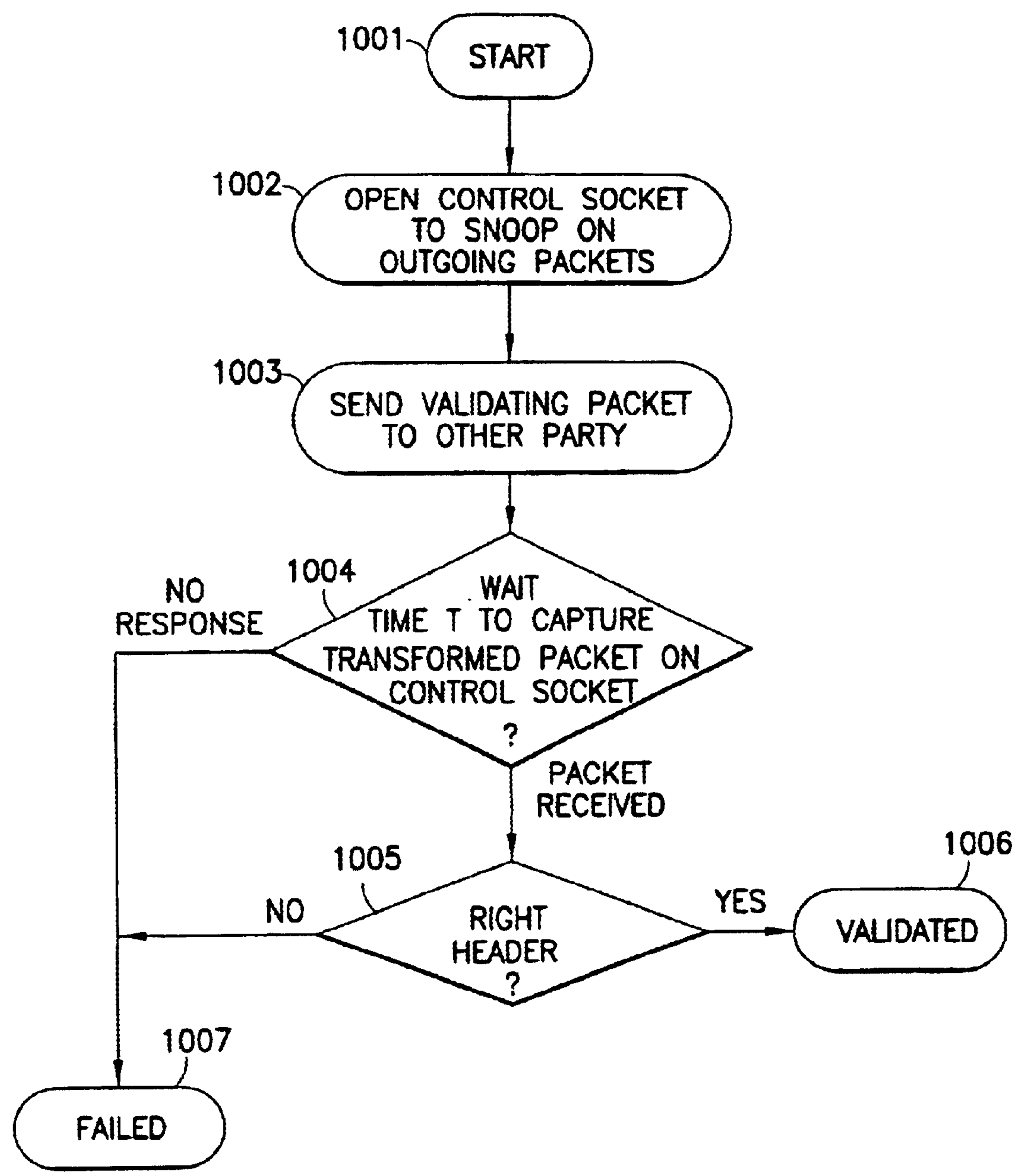
FIG. 10 shows an example of a flowchart of an alternative method for performing a validation step utilizing access to network device driver sockets.
Figure 11:
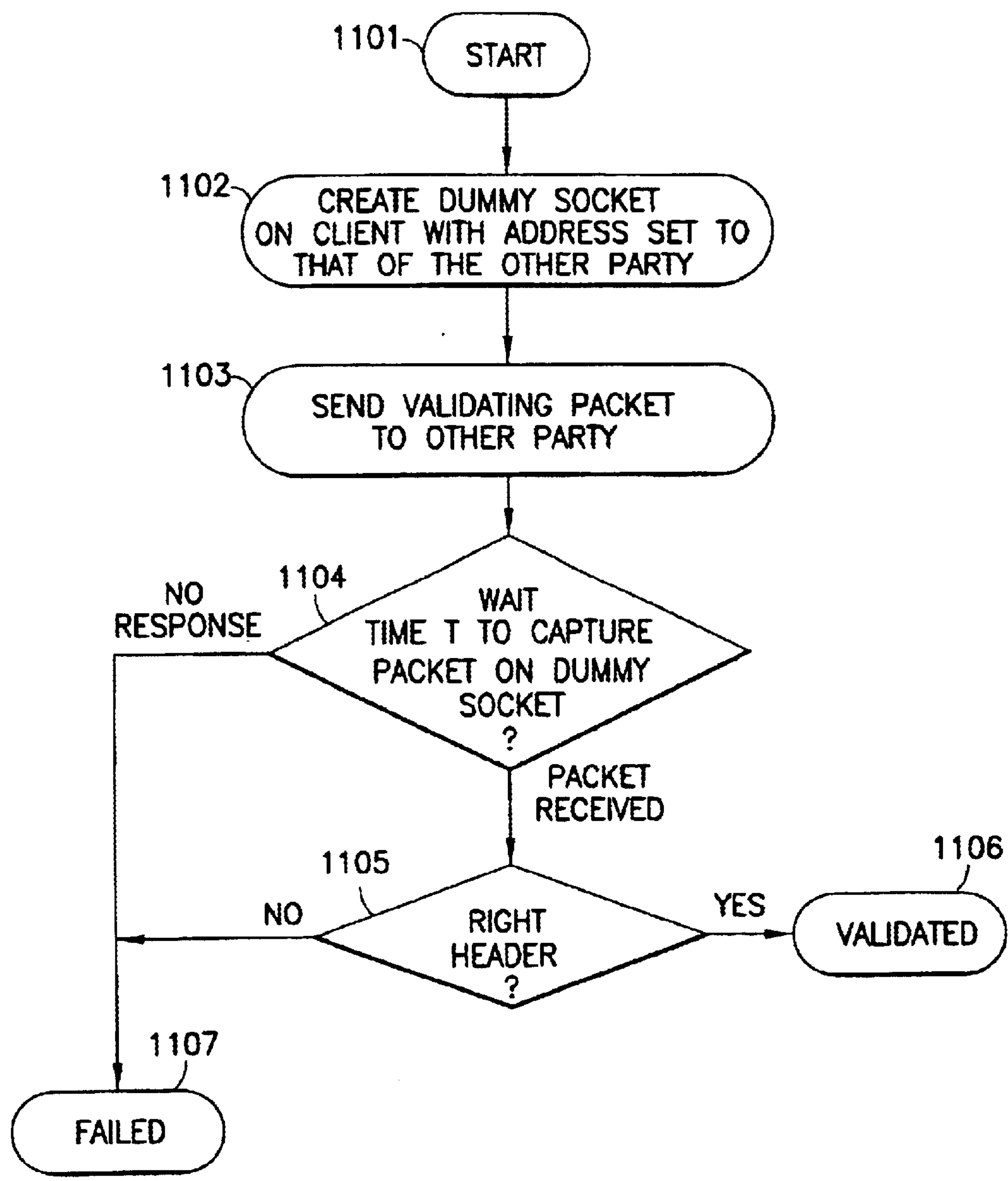
FIG. 11 shows an example of a flowchart of an alternative method for performing a validation step utilizing creation of dummy interfaces to route packets within the network.

FIG. 7 shows an example of a flowchart that illustrates an alternative embodiment of a method useful for a validation mechanism by a client machine. The client first validates the transformation locally (step 703). This can be done by performing one of the validation methods as shown in FIGS. 9, 10 and 11. If the transformation is correct, it validates the transformation used by its partner which is the other machine participating in the validation scheme (step 705).

The validation of the transformation can be done by sending a message to the other end containing a random number. If the other end is able to receive this message, increment the number and perform the correct transformation, we know that the transformation is taking place correctly. Once this check passes, it then sends a message to the other end (step 707) and waits for a response to be received within a period of time (say T seconds) (step 709). If the response is received within T seconds, the client then checks for the validity of the received message (step 711). The response can either be positive or negative based on the transformation checks performed on the server.

Figure 8:
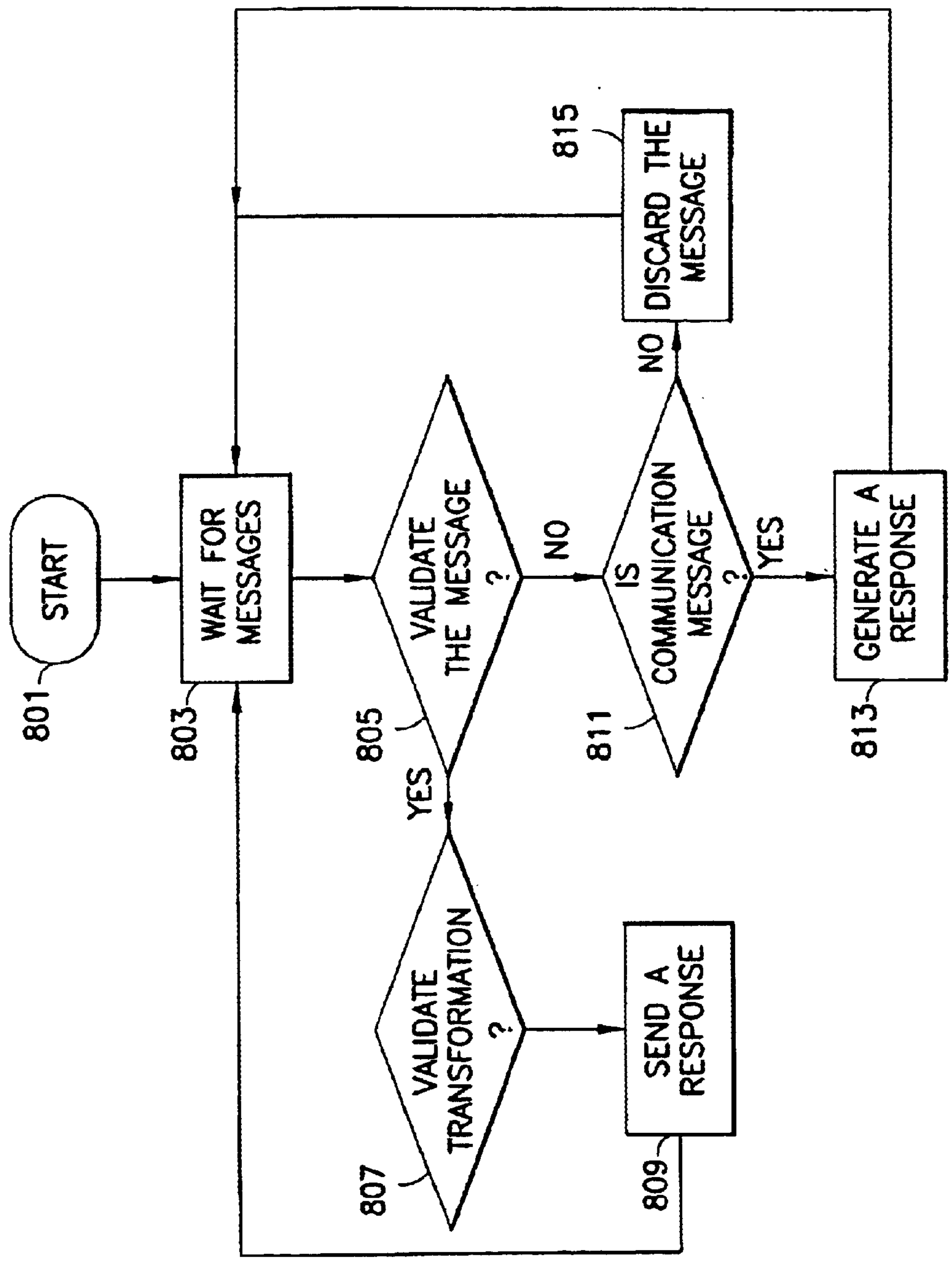
FIG. 8 shows an example of a flowchart of a method used for a validation mechanism described in this invention by the server daemon program running on a machine that participates in the validation scheme when the client program uses the method shown in FIG. 7.

FIG. 8 shows an example of a flowchart that illustrates a method used for a validation mechanism by the validation daemon program running on a machine that participates in the validation scheme when the validation client program uses the method shown in FIG. 7. The validation daemon waits for messages received from the client (step 803). It then checks for the validity of the message (step 805) which means checking to see if the message is a validation request. If the message is valid, it validates its own transformation (step 807). This can be done by performing one of the validation methods as shown in FIGS. 9, 10 and 11. It then sends a response to the client notifying it of the validity of the transformation. The response can be either a positive response or a negative response base on the outcome of the transformation check. It then waits for more incoming messages (step 803). On the other hand if the message received from the client was not valid, it check to see if the message is a communication message. If it is, it then generates a response to the sender (step 813). If it is not a communication message, it discards the message (step 815) and returns to waiting; for more messages (step 803).

FIG. 9 shows a flowchart illustrating an example method for an embodiment performing a validation step required in the invention. The method is entered in step 901. The method shown utilizes packets created with a known time-to-live within the network. The client creates a socket and sets the time-to-live (TTL) value for packets outgoing on that socket to be '1' (step 902). It then sends a packet to the server via this socket (step 903) and waits for a response to be received (step 904). This packet reaches the first-hop router towards the server via standard IP routing. At a router, it is standard practice to decrement the TTL of every incoming packet. If the TTL then becomes '0', a ICMP packet is generated by the router and sent back to the originating host. This ICMP packet contains the header and first 8 bytes of the offending packet. Thus, the packet sent by the client with TTL=1 (in step 903) is intercepted by the first-hop router and a ICMP message is received by the client (step 904). The client then inspects the header of the original packet contained within the ICMP message. If the header and the succeeding eight bytes demonstrate that the necessary transformation was applied to the packet (step 905), then it is validated that the client is applying a transformation function on outgoing packets to the server (step 906). If the client does not receive a response from the first-hop router within a time interval T or if the returned ICMP message contains a IP header and eight bytes that suggests a transformation function was not applied by the client, then in either case, the validation step fails (step 907).

FIG. 10 shows an example of a flowchart illustration of an alternative method for performing the validation step. The method utilizes access to network device driver sockets. The client creates a control socket to snoop on all packets outgoing through a given network device (step 1002). The client then sends a packet to the server. This packet will then undergo a transformation before being sent towards the server via this network device (step 1003). The client waits for a time interval T to capture this outgoing packet via the control socket (step 1004). Once this packet is captured, its header will be examined to check if a transformation was applied to the outgoing packet (step 1005). If so, then this serves to validate that a transformation is being applied to packets sent towards the server. If the packet capture is not successful in step 1004 or if the header information of the captured packet suggests that the transformation was not applied, then the validation step fails.

The method shown in FIG. 10 has the advantage that it would work even for transformations that modify the Time To Live field within the IP header. An example of such a transformation is IP-security ESP in the tunnel mode, which resets the TTL of the outer header to a predetermined value. For such transformations, the approach shown in FIG. 9 would not work. However, the approach shown in FIG. 10 would still work.

A specific implementation of the method shown in FIG. 10 is useful in an embodiment of the invention which does not require a validation daemon at the participating nodes. In this embodiment, the originator of the validation process would initially validate that transformations are occurring on packets being sent out from its side of the IP communication tunnel. It then sends an ICMP echo request to the participating tunnel. The ICMP echo requests are created as defined by established IP standards. In response to the echo request, an echo reply is received. The packet capture mechanism shown in FIG. 10 is used to obtain a copy of the reply before the inverse transformations are applied. It is examined to ensure that the required transformations are occurring on packets originating from the other participant in the tunnel. A copy of the reply is also received after the transformations by the validation client, and it is verified that communication is indeed possible on the IP communication tunnel.

FIG. 11 shows an example of a flowchart for an alternative method for performing the validation step. The method shown utilizes creation of dummy interfaces to route packets within the network. In this method, the client creates a dummy interface and assigns an address to that interface that is same as the server's address (step 1102). Consequently, any packet sent from the client (step 1103) that is addressed to the server is routed back to the client itself in a loopback fashion, instead of being routed into the network towards the actual server. The client waits a time interval T to receive this packet on its dummy interface (step 1104). If the captured packet header demonstrates that a transformation function was applied by the client, then this serves as a positive validation test. Otherwise, if the outgoing packet is not received on the dummy interface or if the packet header do no demonstrate an application of the transformation function to the packet, then the validation step fails.

Figure 12:
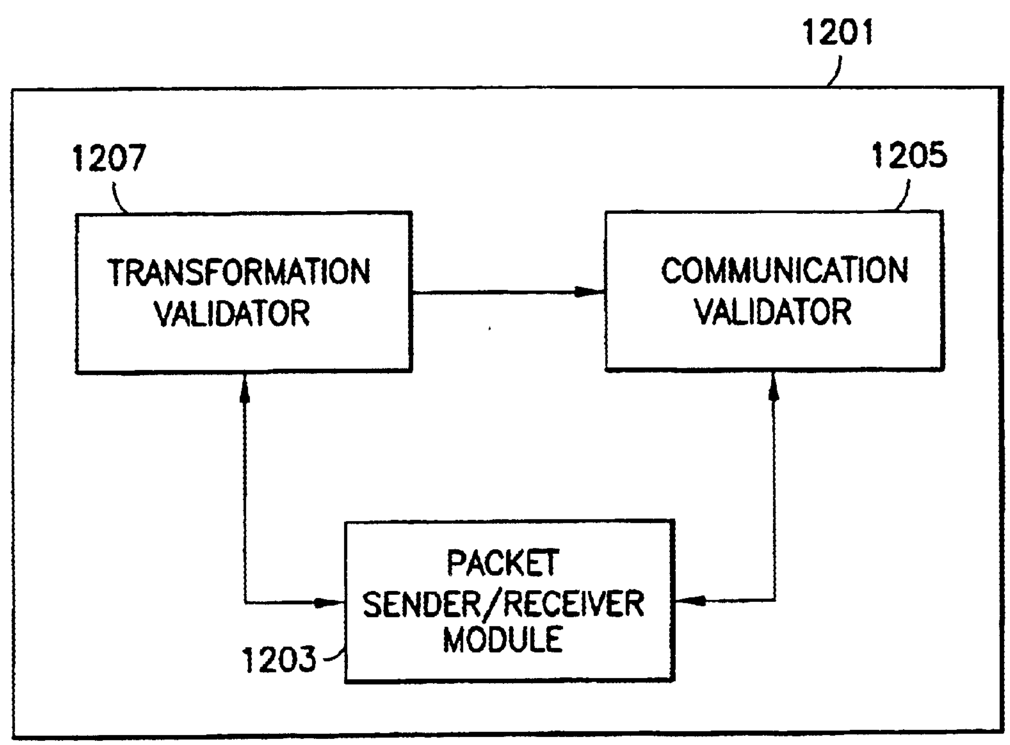
FIG. 12 shows an example apparatus that implements a validation methods in accordance with the present invention.

FIG. 12 shows an example of an apparatus that implements the validation methods as described in this invention. A network device 1201 which implements this inventions comprises a transformation validator 1207, a communication validator 1205, and a packet sender/receiver module 1203. The transformation validator 1207 validates that packets being sent out of the device 1201 are transformed properly. The communication validator 1205 validates that the packets being sent to the device 1201 by other participants in the IP communication tunnel are being transformed properly. These two modules perform their actions by implementing the various methods shown in FIGS. 4 through 11. Both modules 1205 and 1207 send packets to other devices within the network using the packet send/receive module 1203.

Figure 13:
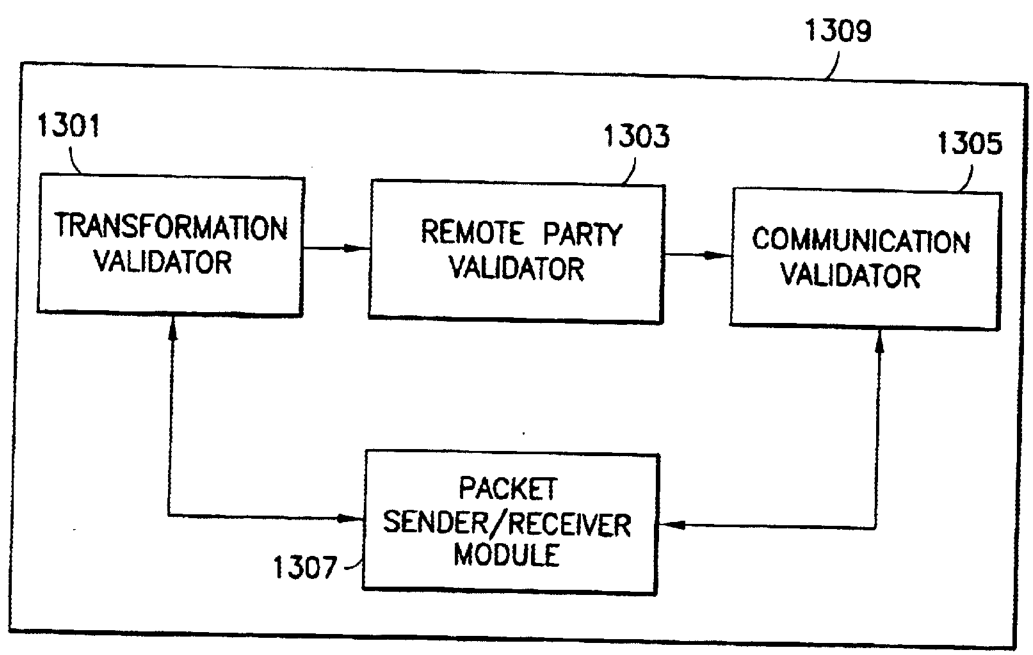
FIG. 13 shows an alternate apparatus that implements a validation method in accordance with the present invention.

FIG. 13 shows an apparatus that implements an alternative embodiment of the validation method as disclosed in this invention. A network device 1309 implementing the disclosure comprises a transformation validator 1301, a remote party transformation validator 1303, a communication validator 1305, and a packet sender/receiver module 1307. The transformation validator 1301 validates that packets being sent out of the device 1309 are transformed properly. The communication validator 1305 validates that the packets being sent to the device 1309 by other participants in the IP communication tunnel are being transformed properly. The remote party transformation validator 1303 is a module that receives requests from other participants in the IP communication tunnel, and validates that local transformations are occurring as expected on the receipt of the messages. It also sends a response back to the participants. These three modules perform their actions by implementing the various methods shown in FIGS. 4 through 11. All three modules 1301, 1303 and 1305 send packets to other devices within the network using the packet send/receive module 1307.

Figure 14:
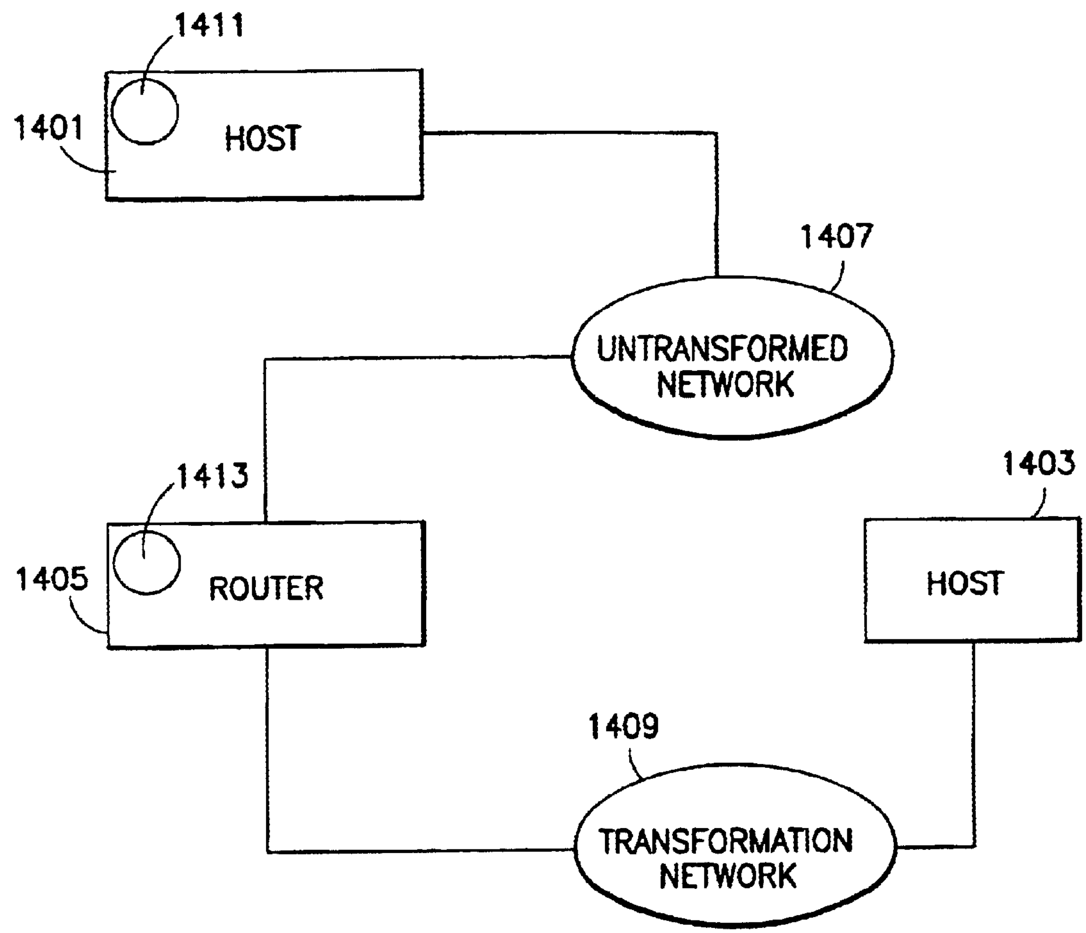
FIG. 14 shows an example environment in which the validation mechanism is used to check partial route transformation when a transformation only occurs on a part of the route used for communication among different machines in accordance with the present invention.

The invention as described here can also be used to check transformations that are only occurring on part of the route on which IP packets flow. This can occur in the cases where an IP communication tunnel is established between two network routers, but the validation programs are executing on the end-stations between which packets are flowing. FIG. 14 shows such an environment. It shows two hosts 1401 and 1403 which are communicating with each other. An IP communication tunnel is established only on a part of the route between the hosts 1401 and 1403. In FIG. 14, the partial transformations are done on the packets between a router 1405 and the host 1403 only. The router 1405 connects to the host 1401 via an network 1407 on which transformations do not take place, and is referred to as the untransformed network. The packets are transformed between the router 1405 and the host 1403, this part of the route is in the transformation network 1409.

In order to validate that the transformations are occurring properly in this configuration, the validation client 1411 configures a filtering agent 1413 to become active inside the router 1405. The filtering agent 1413 will capture a subset of packets passing through the router and provide a copy of them to the validation client 1411. The filters would be set in a way so as to enable the filtering agent to capture the subset of packets for which the validation client is interested in validating that the transformations do occur. An example of a scheme that can be used is by the validation client 1411 marking packets that leave the host 1401. The marking may be done by setting a predetermined value into the Type Of Service field within the IP packet header. Such a field is defined by the Internet Protocol standards known to those familiar with the art. The validation client can then generate packets with specific markings so that they would be captured by the filtering agent 1413. The filtering agent 1413 captures the packets after their transformation and provides a copy of the same to the validation client 1411. The validation client 1411 verifies that the packets have been transformed in the correct fashion.

Figure 15:
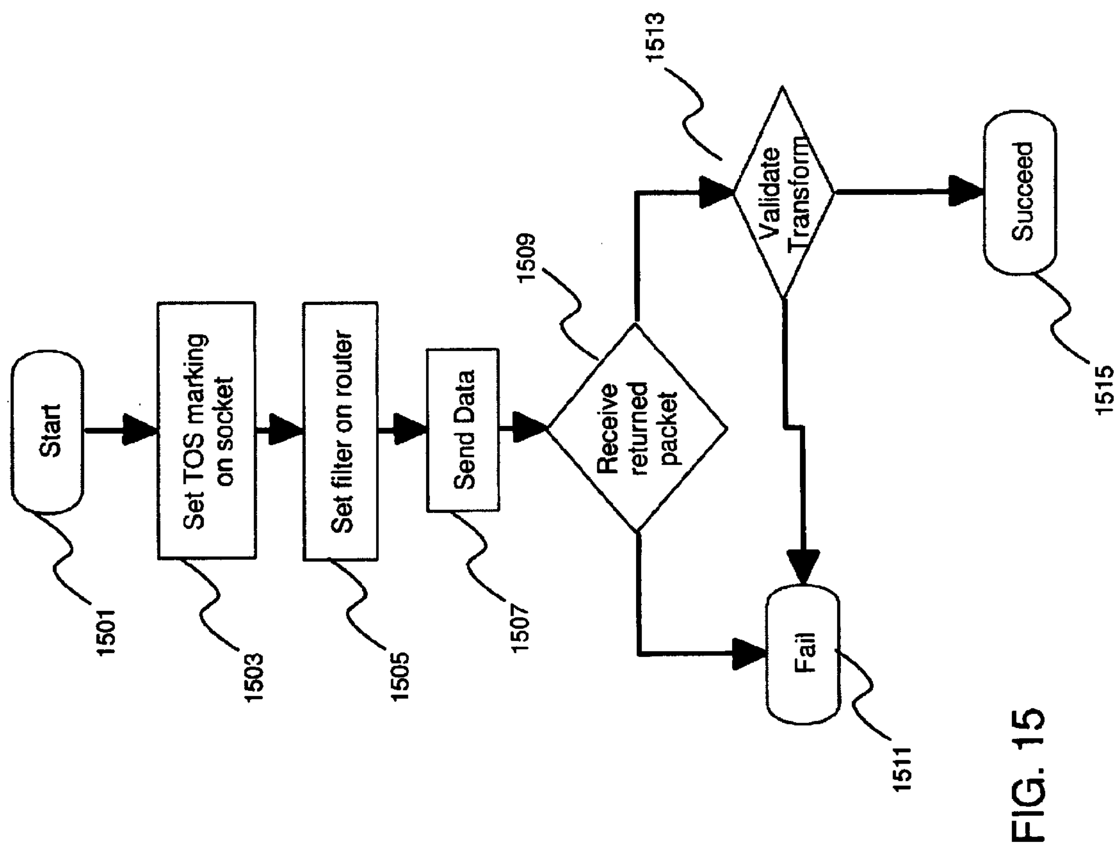
FIG. 15 shows an example of a flowchart of a method for validation partial route transformations in the environment shown by FIG. 14 in accordance with the present invention.

FIG. 15 shows a flowchart illustrating a method for validation partial route transformations in the environment demonstrated by FIG. 14. The method is entered by a validation client in the initialization step 1501. In the next step 1503, the validation client configures the sending device so that the packets generated for the testing purposes would be created with a specific Type of Service (TOS) marking. One of the ways to implement step 1503 is by making a function call to set TOS marking on the socket which will be used to send the packets route. In step 1505, the method configures the filtering agent on the router to capture and send a copy of the packet back to the validation client for the purpose of examination. In step 1507, the validation client sends the a packet out so that it would be marked with the desired TOS marking. In step 1509, it receives a copy of the transformed packet as obtained by the filtering agent. If a packet is not received within a predetermined time period, the method fails and stops in step 1511. If a packet si receives, it checks in step 1513 if the transformations have occurred correctly. It so, the method terminates with success in step 1515, otherwise it fails and terminates in step 1511.

It is noted that there are many variations of the method illustrated in FIG. 9 which can be used to achieve the same results. One variant executes the method illustrated in FIG. 9, wherein the original TTL value created in step 902 is selected so that the TTL expires when the packet leaves the outbound router 1405 shown in FIG. 14. Upon receiving an ICMP message generated due to the expiry of TTL, the validation client can check if the contents of the packet have been transformed correctly. It is noted that those familiar with the art will realize that the apparatus for validating the transformation in a partial route may be the same as those shown in FIGS. 12 and 13, wherein the transformation validator implements the method shown in FIG. 15.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method for validating establishment of at least one IP communication tunnel, the method comprising:

sending an IP packet on the communication tunnel with a predetermined value in a Time-To-Live field such that an ICMP message is generated within said tunnel in response to said value of said Time-To-Live field;

receiving said ICMP message; and examining the contents of the ICMP message to validate that transformations from an originator of a validation process and performed on data packets passing therethrough were done properly.

2. A method for validating establishment of at least one IP communication tunnel, the method comprising:

establishing a network device level socket at the originator that examines all packets passing through a selected network device;

sending an IP packet on the communication tunnel;

receiving a copy of the IP packet from the device level socket after transformations from an originator of a validation process and performed on data packets passing therethrough have been applied; and examining the contents of the copy to validate that the transformations were done properly.

3. A method for validating establishment of at least one IP communication tunnel, the method comprising:

establishing a dummy interface at originator with the address of a participant in the tunnel;

sending an IP packet on the communication tunnel to the participant;

receiving the IP packet from the dummy interface after transformations from an originator of a validation process and performed on data packets passing therethrough have been applied; and examining the contents of the packet to validate that transformations performed on data packets passing therethrough were done properly.

4. A method as recited in claim 1, wherein the IP communication tunnel uses Generic Routing Encapsulation as the transformation.

5. A method for validating establishment of at least one IP communication tunnel, formed on a portion of a route between a first end-station and a second end-station, the method comprising:

configuring a router to form a filtering agent on said tunnel to filter a subset of packets generated within said first end-station;

generating IP packets in said first end-station with markings on the communication tunnel;

returning filtered packets from said filtering agent in said router to said first end-station and examining the filtered packets generated by said first end-station, having said markings and returned by said filtering agent to validate that transformations from an originator of a validation process and performed on data packets passing therethrough have been done properly.

6. A method as recited in claim 5, used for validation of a partial route transformation.

7. A method as recited in claim 1, wherein the IP communication tunnel uses the IP-security protocols established using the Internet Key Exchange.

8. A method as recited in claim 1, wherein the IP communication tunnel uses IP compression as the transformation.

9. A method as recited in claim 1, wherein the IP communication tunnel uses network address translation as the transformation.

10. A method for validating establishment of an IP communication tunnel, the method comprising:

validating that transformations from an originator of a validation process have been established properly by invoking a validation client on said originator, that tests and verifies that packets originating on said originator have been properly transformed;

after successful validation in the previous step, requesting that at least one other participant in the tunnel validate that the transformations from that participant have been established properly by invoking a validation client on said other participant, that tests and verifies that packets originating on said other participant have been properly transformed; and verifying that the other participant in the tunnel can communicate with the originator of the validation process.

11. An apparatus for validating establishment of IP communication tunnels as recited in claim 1, further comprising a remote party transformation validator for validating that at least one participant in the tunnel performs the transformation properly.

12. An article of manufacture comprising a computer usable medium having computer readable program code means embodied therein for causing validation of establishment of at least one IP communication tunnel, the computer readable program code means in said article of manufacture comprising computer readable program code means for causing a computer to effect the steps of claim 1.

13. A computer program product comprising a computer usable medium having computer readable program code means embodied therein for causing validation of establishment of at least one IP communication tunnel, the computer readable program code means in said computer program product comprising computer readable program code means for causing a computer to effect the steps of claim 1.

14. A program storage device readable by machine, tangibly embodying a program of instructions executable by the machine to perform method steps for validating establishment of at least one IP communication tunnel, said method steps comprising the steps of claim 1.

15. An article of manufacture comprising a computer usable medium having computer readable program code means embodied therein for causing validation of establishment of at least one IP communication tunnel, the computer readable program code means in said article of manufacture comprising computer readable program code means for causing a computer to effect the steps of claim 10.

16. A computer program product comprising a computer usable medium having computer readable program code means embodied therein for causing validation of establishment of at least one IP communication tunnel, the computer readable program code means in said computer program product comprising computer readable program code means for causing a computer to effect the steps of claim 10.

17. A program storage device readable by machine, tangibly embodying a program of instructions executable by the machine to perform method steps for validating establishment of at least one IP communication tunnel, said method steps comprising the steps of claim 10.

18. A computer program product comprising:

a computer usable medium having computer readable program code means embodied therein for causing validation of establishment of at least one IP communication tunnel, the computer readable program code means in said computer program product comprising:

computer readable program code means for causing a validating computer to effect the functionality of a transformation validator as specified in claim 3, for validating that the transformations from an originator of the validation process has been done properly; and computer readable program code means for causing the validating computer to effect the functionality of a communication validator for validating that at least one participant in the tunnel can communicate with the originator.

19. A computer program product recited in claim 18, wherein the computer readable program code means further comprises computer readable program code means for causing the computer to effect the functionality of a remote party transformation validator for validating that at least one participant in the tunnel performs the transformation properly.

* * * * *